Feb. 11, 1969   R. WICK ET AL   3,426,661
PHOTOGRAPHIC CAMERA WITH ELECTRONIC FLASH UNIT
Filed July 5, 1966
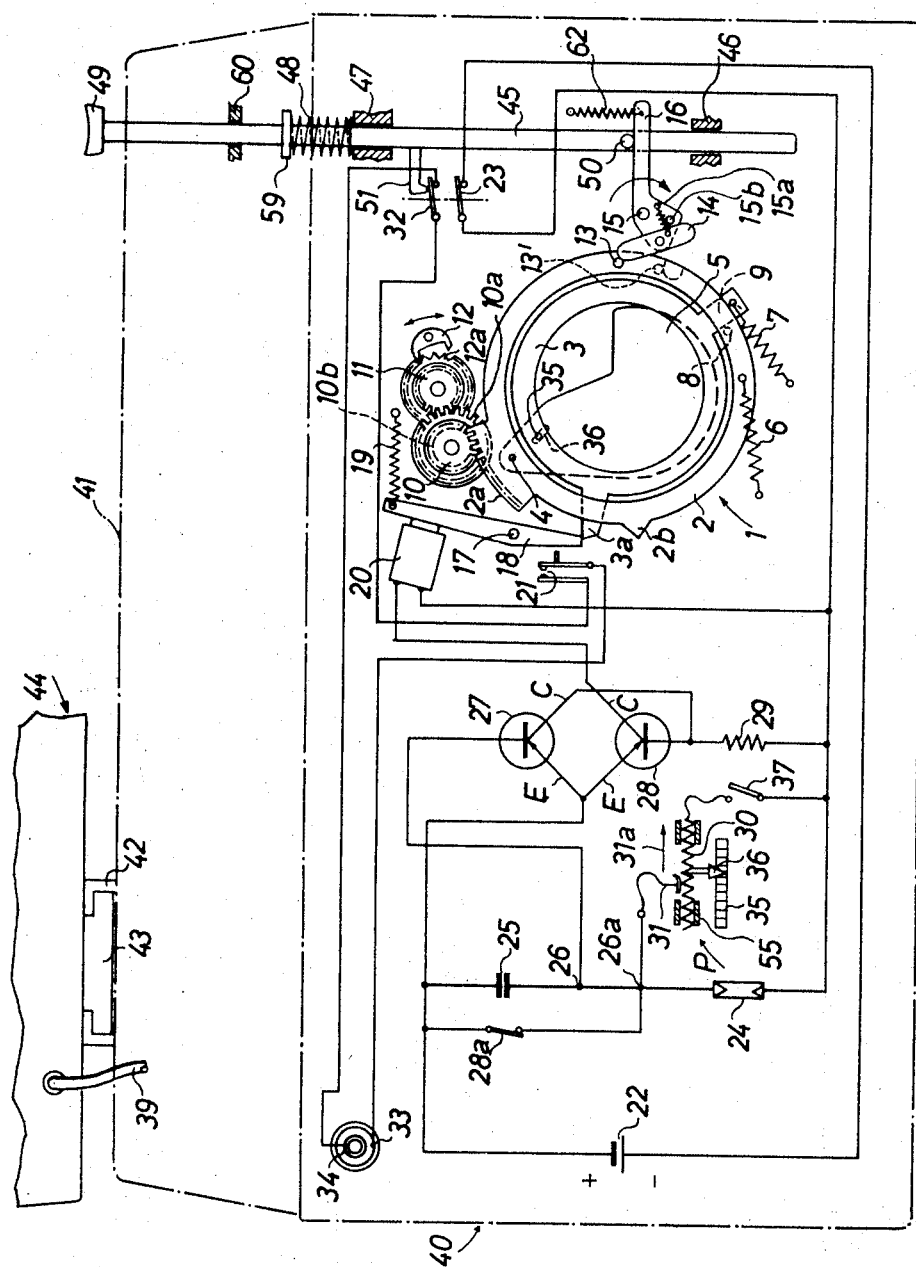
INVENTOR.
RICHARD WICK
FRIEDRICH BIEDERMANN
ALFRED WINKLER
FRIEDRICH BESTENREINER
GÜNTER PAWLIK
REINHARD v. SYBEL
ERWIN v. WASIELEWSKI United States Patent Office 3,426,661
Patented Feb. 11, 1969

3,426,661
PHOTOGRAPHIC CAMERA WITH ELECTRONIC FLASH UNIT
Richard Wick, Gruenwald, near Munich, Friedrich Biedermann, Unterhaching, Munich, Alfred Winkler, Munich, Friedrich Bestenreiner, Gruenwald, near Munich, Gerd Kiper, Unterhaching, Munich, Guenter Pawlik, Munich, Reinhard von Sybel, Krailling, and Erwin von Wasielewski, Munich, Germany, assignors to Agfa-Gevaert Aktiengesellschaft, Leverkusen, Germany
Filed July 5, 1966, Ser. No. 562,602
Claims priority, application Germany, July 14, 1965, A 49,742
U.S. Cl. 95—10                    11 Claims
Int. Cl. G01j 1/00; G03b 9/70, 9/02

The present invention relates to photographic cameras in general, and more particularly to improvements in photographic cameras which can be combined with or embody a built-in electronic flash unit. Still more particularly, the invention relates to photographic cameras which can be used with electronic flash units and wherein the size of the diaphragm aperture can be adjusted as a function of the intensity of incoming light.

For making exposures with an electronic flash unit, a photographic camera must be reset to account for certain characteristics, particularly for the guide number, of the flash unit and also to account for the distance between the flash unit and the subject. Heretofore known assemblies which are used to reset or convert cameras for use with electronic flash units are either too complicated, too prone to malfunction, too expensive and/or insufficiently accurate so that an exposure with electronic flash often yields pictures which are not entirely satisfactory. Furthermore, heretofore known adjusting or resetting assemblies which are used to convert a photographic camera for use with electronic flash units are not suited for incorporation in cameras having certain types of diaphragms, especially a so-called shutter diaphragm wherein movement of one aperture setting or selecting member with reference to another setting member brings about a gradual increase in the size of the diaphragm aperture while the other setting member remains in cocked position.

Accordingly, it is an important object of the present invention to provide a photographic camera wherein the size of the diaphragm aperture can be varied from zero to a maximum value and wherein the characteristics of an electronic flash unit and/or the distance between the flash unit and the subject may be accounted for in a very simple and inexpensive way.

Another object of the present invention is to provide a novel exposure control including an electric circuit which can be incorporated in a camera of the just outlined characteristics and which can be combined with the flash circuit so that the discharge of flash takes place at the exact moment when the size of the diaphragm aperture is selected to reflect the intensity of prevailing light, the guide number of the flash unit, the distance of the flash unit from the subject, and the intensity of light produced by a flash.

A further object of the invention is to provide a novel resistor which can be utilized in the above outlined circuit and which can reset the camera for operation with electronic flash by full consideration of one or more characteristics of the flash unit and also by full consideration of the distance between the flash unit and the subject.

A concomitant object of the invention is to provide a novel switching unit which may be utilized in the improved circuit and to construct and assemble the switching unit in such a way that it can perform a plurality of functions including operating the flash unit, arresting or releasing selected movable components of the diaphragm, and others.

Still another object of the invention is to provide a novel exposure control for still cameras or movie cameras which can be used for making exposures in daylight and can be adjusted to take into account several other parameters or factors, such as the distance between the flash unit and the subject when the exposure is to be made with flash, and the guide number of the flash unit.

Briefly stated one feature of our invention resides in the provision of a photographic camera which comprises adjustable diaphragm means for providing different apertures, an exposure control including a source of electrical energy, a capacitor connected in series with the source and with a light-sensitive resistor element so that, on completion of the circuit, the capacitor is charged at a rate influenced by the resistance offered by the light-sensitive resistor element in dependency on the intensity of incident light, and a switching unit which is operatively connected with the diaphragm means and is arranged to influence the size of the aperture as a function of the condition of the capacitor. The camera is further provided with built-in or detachable electronic flash means and with variable resistor means connected in parallel with the light-sensitive resistor element and in series with the capacitor to offer to the flow of electric current a resistance which is indicative of at least one characteristic, preferably the guide number, of the flash means. When the flash means is in use, the capacitor is charged through the light-sensitive resistor element and also through the variable resistor means.

In accordance with a more specific feature of our invention, the variable resistor means preferably takes the form of a potentiometer having a sliding contact and a slidable resistance wire which engages the contact. Movement of the resistance wire with reference to the contact and/or vice versa changes the resistance of the potentiometer. The wire can be adjusted to account for the guide number of the electronic flash unit and the sliding contact may be adjusted by a linkage or by another suitable motion transmitting device to account for the distance between the flash unit and the subject. The just mentioned linkage may be coupled to and operated by the range finder of the camera.

The switching unit can comprise a pair of suitably interconnected transistors and an electromagnet which is adapted to determine the exact moment when the aperture of the diaphragm means is closed. We prefer to utilize a diaphragm wherein two setting members are movable with or with reference to each other and wherein the movement of one setting member with reference to the other setting member results in changes in the size of the aperture. The electromagnet can release the other setting member which then closes the aperture at a moment which will be determined by the condition of the capacitor and hence by the intensity of light which is permitted to reach the light-sensitive resistor element. The two setting members can take the form of concentric rings which control the position of two or more blades whereby the blades either define or close an aperture whose size is a function of the angular position of the two rings with reference to each other.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawing the single illustration of which is a schematic front elevational view of a still camera embodying the present invention.

Referring to the drawing in detail, there is shown a still camera having a housing 40 whose top wall 41 is provided with a standard accessory shoe 42 adapted to receive the foot 43 of an electronic flash unit 44. This flash unit has a predetermined guide number and has a synchronizing cord 39 connectable to coaxial contacts 33, 34 on the camera housing 40. The latter carries a combined shutter and diaphragm 1 including a leading setting member or ring 2 and a trailing setting member or ring 3. The leading ring 2 is rotatably supported by the front wall of the housing 40 and is concentric with the trailing ring 3. Pivot pins 4 on the leading ring 2 carry diaphragm blades 5 and each such blade carries a follower pin 35 extending into an elongated cam slot 36 of the trailing ring 3. The drawing merely shows a single blade 5. When the rings 2 and 3 rotate as a unit and in the same direction, the size of the aperture defined by the blades 5 remains unchanged. When the leading ring 2 moves with reference to the trailing ring 3 in a clockwise direction, the size of the aperture increases and the size of the aperture will decrease if the trailing ring 3 moves with reference to the leading ring 2 in a clockwise direction. Thus, the extent of relative movement between the rings 2, 3 determines the size of the diaphragm aperture.

The leading ring 2 is biased by a helical return spring 6 one end of which is attached to the housing 40. A second return spring 7 biases the trailing ring 3 and each of these springs tends to rotate the respective ring in a clockwise direction, as viewed in the drawing. The leading ring 2 carries a motion transmitting or entraining pin 8 which normally abuts against a projection or lug 9 of the trailing ring 3 so that this trailing ring is compelled to rotate with the leading ring 2 when the latter moves in a counterclockwise direction. In other words, the size of the diaphragm aperture remains zero when the leading ring 2 is rotated anticlockwise to the fully cocked position shown in the drawing because the pin 8 compels the trailing ring 3 to share such movement. The diaphragm is closed whenever the lug 9 abuts against the pin 8.

The leading ring 2 has a toothed or serrated portion 2a which forms part of a retarding mechanism and meshes with a gear 10 which is mounted in the housing 40. The retarding mechanism further includes a gear 11, an escapement wheel 12a which is coaxially connected with the gear 11, an escapement anchor 12 which cooperates with the wheel 12a, a gear 10a which is coaxial with the gear 10 and meshes with the gear 11, and a one-way clutch 10b which connects the gear 10 with the gear 10a in such a way that the gear 10 is free to rotate in one direction but is prevented from rotating relative to the gear 10a in the opposite direction. The one-way clutch 10b allows the leading ring 2 to rotate in a counterclockwise direction, i.e., the gear 10 can rotate clockwise with reference to the gear 10a.

The means for cocking the leading ring 2 comprises a cocking pin 13 which is mounted on this ring and a two-armed cocking lever 14 rockable on a second two-armed lever 16 which is pivotally secured to the housing 40 by a pin 15 and can be rocked by a reciprocable trigger 45. A spring 15a urges the cocking lever 14 against a stop 15b on the lever 16. The trigger 45 is guided in bearings 46, 47 and is biased upwardly by a helical spring 48 which abuts against a collar 59. When the head 49 of the trigger 45 is depressed by hand, the collar 59 moves away from a fixed stop 60 and a pin 50 of the trigger rocks the lever 16 in a clockwise direction whereby the cocking lever 14 engages the cocking pin 13 and turns the leading ring 2 in a counterclockwise direction against the opposition of the spring 6. The trailing ring 3 shares such movement because its lug 9 abuts against the pin 8. In response to a predetermined angular displacement of the lever 16 and leading ring 2, the cocking lever 14 bypasses the cocking pin 13 and the leading ring begins to turn in a clockwise direction under the bias of the return spring 6 and at a speed determined by the retarding mechanism 2a, 10, 10a, 10b, 11, 12, 12a. When the triger 45 is released, it moves upwardly under the bias of the spring 48 and the spring 15a allows the cocking lever 14 to again bypass the cocking pin 13. The lever 16 is biased by a spring 62.

A blocking lever 18 which forms part of a novel switching unit is rockable on a fixed pin 17 and is permanently biased by a spring 19 which tends to rotate this lever in a clockwise direction. The lever 18 constitutes the movable armature of an electromagnet 20 which forms part of the aforementioned switching unit and which, when energized, overcomes the bias of the spring 19 and maintains the blocking lever 18 in the illustrated position. The lever arm of the blocking lever 18 then extends into the path of a second projection or lug 3a on the trailing ring 3 so that this ring cannot follow the bias of the spring 7 and remains in the illustrated fully cocked position until the electromagnet 20 is deenergized. It is to be noted that the drawing shows each of the two rings 2, 3 in a fully cocked position, i.e., the cocking lever 14 is about to bypass the cocking pin 13 and the spring 6 has undergone maximum expansion so that it stores energy and can begin to move the leading ring 2 back to starting or uncocked position at the speed determined by the retarding mechanism. A further stop (not shown) arrests the leading ring 2 in uncoeked position.

The spring 19 moves the blocking lever 18 away from the path of the lug 3a as soon as the electromagnet 20 is deenergized so that the spring 7 then rapidly returns the lug 9 of the trailing rings 3 into abutment with the pin 8 of the leading ring 2 to thereby close the diaphragm. The blocking lever 18 then closes a normally open flash switch 21 in the circuit of the flash unit 44.

The aforementioned switching unit comprises the electromagnet 20 with blocking lever 18 and spring 19, and this switching unit forms part of an exposure control which further includes a source 22 of electrical energy (preferably a battery), a normally open master switch 23 which is connected in series with the battery 22 and can be closed by a trip 51 on the trigger 45 when the latter leaves its starting position, and a light-sensitive resistor element 24 which is also connected in series with the battery 22. The circuit of the exposure control further includes a capacitor 25 connected in series with the resistor element 24. A tap between the resistor element 24 and capacitor 25 is connected with the base of a first transistor 27. The capacitor 25 is connected in parallel with a switch 28a which is normally closed but is opened at the moment when the cocking lever 14 bypasses the pin 13 of the leading ring 2. For example, the ring 2 can be provided with a projection or trip 2b which opens the switch 28a as soon as the ring 2 is fully cocked.

The transistor 27 constitutes with a second transistor 28 an important component of the aforementioned switching unit. The emitters E of both transistors are connected with the positive pole of the battery 22. The collector C of the transistor 27 is connected with the base of the transistor 28 and the electromagnet 20 is connected between the collector C of the transistor 28 and the negative pole of the battery 22. The base of the transistor 28 is connected with the negative pole through a resistor 29.

A variable resistor, here shown as a potentiometer P, is connected between a tap 26a and the negative pole of the battery 22. This potentiometer P has a sliding contact 31 and a resistance wire 30 which is slidable in guides 55 provided in the housing 40. The sliding contact 31 is connected with the range finder of the camera and the resistance wire 30 is shiftable by a manually operated index 36 cooperating with a fixed scale 35. The position of the index 36 and scale 35 can be reversed. The scale 35 is calibrated to indicate various guide members. The motion transmitting connection between the range finder and the sliding contact 31 of the potentiometer P is such that the resistance offered by the potentiometer to the flow of electric current increases with adjustment of the objective to account for a greater distance of the flash unit 44 from the subject. This motion transmitting connection is indicated by an arrow 31a and can comprise a linkage or an analogous motion transmitting device. The index 36 extends from the housing 40 so that it can be displaced by hand, either directly or by means of a suitable hand-grip member. The setting of the index 36 with reference to the sacle 35 reflects the guide number of the electronic flash unit 44.

The resistance wire 30 of the potentiometer P is connected in series with a switch 37 which opens automatically when the flash unit 44 is detached from the housing 40. This switch can be opened in response to withdrawal of the foot 43 from the shoe 42 but must be closed when the operator wishes to make an exposure with flash. Alternatively, the switch 37 can be closed by a suitable actuating member which is manipulated only when the operator wishes to use the flash unit 44. This enables the operator to leave the flash unit 44 on the housing 40 when the exposure is to be made in daylight or in aritificial light other than that furnished by the flash unit 44.

The camera of our invention can utilize practically all presently known electronic flash units as long as such flash units can be connected in the aforedescribed circuit, either through the contacts 33, 34 or in another suitable way. The flash unit 44 can be permanently attached to or built into the housing 40. The circuit further includes a switch 32 which can be closed by the trip 51 and serves to connect the contacts 33, 34 in the remainder of the circuit.

The operation of the camera is as follows:

Prior to making an exposure with flash, the parts of the circuit assume the positions shown in the drawings with the exception that the switches 23, 32 remain open. The operator then closes the switch 37, either by connecting the foot 43 to the shoe 42 or by manipulating a separate actuating member. The synchronizing cord 39 of the flash unit 44 is assumed to be connected with the contacts 33, 34 and the index 36 is adjusted so that its setting reflects the guide number of the flash unit 44, i.e., that it registers with a selected graduation of the scole 35. The user then operates the range finder to thereby adjust the sliding contact 31 with reference to the resistance wire 30 through the motion transmitting connection 31a. As stated before, the potentiometer P offers a greater resistance if the objective is adjusted in a sense to account for a greater distance of the flash unit 44 from the subject.

The operator then depresses the head 49 of the trigger 45 whereby the trip 51 closes the switches 23 and 32. Closing of the switch 32 places the flash unit 44 in condition for generation of artificial light and the closing of the switch 23 places the exposure control in operative condition. The base of the transistor 28 is then negatively charged with respect to the emitter E so that the electromagnet 20 is energized and attracts the adjoining arm of the blocking lever 18 against the opposition of the spring 19. Such energization of the electromagnet 20 has no immediate effect on the diaphragm.

As the operator continues to depress the head 49 of the trigger 45, the pin 50 rocks the lever 16 and the latter displaces the cocking lever 14 so that the cocking pin 13 moves from the broken-line position 13' toward the solid-line position. The leading ring 2 rotates in a counterclockwise direction and its pin 8 entrains the trailing ring 3 so that the diaphragm remains closed. Shortly before the rings 2, 3 are fully cocked, the projection 3a rocks the lever 18 in a clockwise direction but allows the lever to return to the illustrated position at the time when or shortly before the cocking lever 14 bypasses the pin 13. The lower arm of the lever 18 then blocks the trailing ring 3 because the electromagnet 20 is energized and causes the lever 18 to return to its blocking position.

The spring 6 begins to dissipate energy as soon as the cocking lever 14 moves beyond the cocking pin 13 so that the ring 2 starts to rotate in a clockwise direction at the speed determined by the retarding mechanism including the gear 10. The trailing ring 3 is arrested so that such clockwise rotation of the leading ring 2 results in gradual opening of the diaphragm which admits light through an aperture whose size increases as a function of relative movement between the rings 2 and 3. The exposure has begun and the trip 2b of the moving ring 2 opens the switch 28a so that the capacitor 25 starts to accumulate a charge. This capacitor is charged through the light-sensitive resistor element 24 which is exposed to incident light so that the exposure is made by full consideration of existing light other than that produced by the flash unit 44. The capacitor 25 is also charged through the potentiometer P and tap 26a whereby the potentiometer shortens or lengthens the interval necessary for building up a critical potential. The length of such interval depends on the guide number of the flash unit 44 (setting of the index 36) and on the distance between the flash unit and the subject (setting of the sliding contact 31). When the critical potential is actually reached, the base of the transistor 27 is negatively charged with respect to the emitter E.

The emitter-collector stage of the transistor 27 is a better conductor than the resistor 29 so that the base of the transistor 28 is not negatively charged with respect to the emitter E. The transistor 28 ceases to conduct current, the electromagnet 20 is deenergized and the spring 19 rocks the blocking lever 18 so that the trailing ring 3 is released and rapidly returns its lug 9 into abutment with the pin 8 of the leading ring 2 to thereby close the diaphragm. Such clockwise rotation of the trailing ring 3 is caused by the return spring 7 and requires very little time because the ring 3 is not braked by a retarding mechanism.

When the trailing ring 3 starts to rotate in a clockwise direction, the blocking lever 18 closes the flash switch 21 so that the flash unit 44 produces a flash. The generation of the flash requires little time and its duration is very short so that the subject is illuminated substantially at the time when the size of the diaphragm aperture attains its maximum permissible value. It is to be borne in mind that inertia and friction which oppose return movement of the trailing ring 3 under the bias of the spring 7 cause a certain delay in closing of the diaphragm, and such delay suffices to insure that the unit 44 produces a flash while the size of the aperture at least approximates a maximum value for a given exposure.

If the intensity of prevailing light is very weak, if the guide number of the flash unit 44 is very low, or if the distance between the subject and the flash unit is very great, the time required for deenergization of the electromagnet 20 is longer and the size of the aperture is greater. This will be readily understood since the electromagnet 20 determines the extent of clockwise movement of the leading ring 2 with the reference to the trailing ring 3 and hence the size of the diaphragm aperture.

The size of the aperture will be allowed to assume a maximum value if the electromagnet 20 is deenergized after the leading ring 2 returns to the uncocked position, i.e., if the unit 44 produces a flash after the leading ring 2 ceases to rotate in a clockwise direction. A picture which is taken under such circumstances can be underexposed but can still prove to be of value if the illumination of the subject is not well below a minimum acceptable value.

The guide number is indicative of the capacity of the flash unit 44. Depending on the setting of the index 36, the guide number of the flash unit 44 is taken into consideration when the light-sensitive resistor element influences the size of the diaphragm aperture as a function of the intensity of light other than that produced by the flash unit. The same holds true for the setting of the sliding contact 31 in independency on the distance between the flash unit 44 and the subject, i.e., the size of the aperture at the time the unit 44 produces a flash is also influenced by such distance whereby the setting of the contact 31 preferably takes place in automatic response to manipulation of the range finder.

The potentiometer P can shorten the time necessary for deenergization of the electromagnet 20 in such a way that the deenergization (and the resultant operation of the flash unit 44 in response to closing of the switch 21) takes place at a time when the diaphragm aperture has an optimum size for the intensity of light which is produced by the flash unit. This is always the case when the size of the diaphragm aperture increases continuously from a minimum value toward a maximum value. In other words, if the electromagnet 20 is deenergized sooner because the capacitor is also charged across the potentiometer P, the size of the aperture is less than that when the deenergization of the electromagnet 20 is determined solely by the intensity of light which reaches the resistor element 24 and emanates from a source other than the flash unit 44. Thus, connection of the potentiometer P in parallel with the resistor element 24 invariably reduces the time necessary for charging the capacitor 25 as long as the switch 37 is closed, i.e., whenever the camera is set for operation with flash. By the simple expedient of opening the switch 37, the operator disconnects the potentiometer P and the camera is then ready to make exposures in daylight or in artificial light produced by means other than the flash unit 44 whereby the resistor element 24 is the sole member which determines the exact time when the capacitor is charged sufficiently to bring about deenergization of the electromagnet 20 through the transistors 27 and 28. The index 36 of the potentiometer P must be adjusted only once, as long as the flash unit 44 remains connected with the housing 40. This index must be adjusted only if the flash unit 44 is replaced by a unit having a different guide member. Also, and since the sliding contact 31 is preferably connected with the range finder, its adjustment is fully automatic so that, save for opening or closing of the switch 37, the camera need not be reset by hand just because an exposure is to be made with flash.

The aforementioned range finder can be of the type which is adjusted by hand or it may be constituted by a fully automatic optical or electronic distance measuring device of any known design. In either case, the sliding contact 31 is adjusted automatically as long as it is properly coupled to the range finder.

The potentiometer P constitutes a very simple integrator which can set the camera by full consideration of several parameters, such as the characteristics (guide number) of the flash unit 44 and the distance of the flash unit from the subject.

The structure which is shown in our drawing can be simplified still further if the deenergization of the electromagnet 20 results only in completion of the flash circuit and if the leading ring 2 continues to turn in a sense to increase the size of the diaphragm aperture up to a maximum value. In such a camera, the trailing ring 3 can be released by a lever or the like which is actuated when the leading ring 2 reassumes its uncocked position. The influence of light other than that produced by the flash unit upon the total amount of light is relatively small because an exposure with flash is normally made only when the prevailing lighting conditions are insufficient for taking of pictures.

Our invention can be embodied with equal or substantially equal advantage in cameras wherein the circuit of the exposure control is not incorporated into the flash circuit, i.e., wherein the size of the diaphragm aperture is selected first and the illumination begins thereafter. The flash circuit can be completed at any time subsequent to selection of the aperture. In such cameras the means for completing the flash circuit need not be combined with the exposure control.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and therefore, such adaptations should and are intended to be comprehended within the meaning and range of equivalence of the following claims.

What is claimed as new and desired to be protected by Letters Patent is:

1. In a photographic camera, adjustable diaphragm means for providing different apertures; an exposure control including a source of electrical energy, a capacitor connected in series with said source, a light-sensitive resistor element connected in series with said capacitor so that, on completion of the circuit of said source, said capacitor is charged at a rate influenced by the resistance offered by said resistor element as a function of incident light, and a switching unit operatively connected with said diaphragm means and arranged to influence the size of said aperture as a function of the condition of said capacitor; electronic flash means; and variable resistor means connected in parallel with said light-sensitive resistor element and in series with said capacitor to offer to the flow of electric current a resistance which is indicative of at least one characteristic, such as the guide number, of said flash means.

2. A structure as set forth in claim 1, wherein said diaphragm means comprises a first setting member movable from a first end position toward a second end position to thereby increase the size of said aperture and a second setting member movable from a first end position toward a second end position to thereby close said aperture, said control unit being arranged to determine the exact time of movement of the second setting member to second end position.

3. A structure as set forth in claim 1, further comprising means for selecting the resistance of said variable resistor means as a function of the distance of said flash means from the subject.

4. A structure as set forth in claim 1, further comprising control means for operating said flash means and an operative connection between said switching unit and said control means for effecting the operation of said flash means when the size of said aperture assumes a predetermined value.

5. A structure as set forth in claim 1, further comprising switch means connected in series with said variable resistor means and movable between closed and open positions to respectively connect and disconnect said variable resistor means from the circuit of said capacitor so that the camera can be used for making exposures in daylight in response to opening of said switch means.

6. A structure as set forth in claim 1, wherein said variable resistor means is a potentiometer having a resistor member and a contact member engaging said resistor member, at least one of said members being movable with reference to the other member to thereby change the resistance of said potentiometer and further comprising motion transmitting means for moving said one member as a function of the distance between the flash means and the subject.

7. A structure as set forth in claim 1, wherein said variable resistor means is a potentiometer having a resistor member and a contact member engaging said resistor member, at least one of said members being movable with reference to the other member to thereby change the resistance of said potentiometer as a function of the guide number of said flash means.

8. A structure as set forth in claim 7, wherein the other of said members is movable with reference to said one member and further comprising motion transmitting means for moving said other member as a function of the distance between the flash means and the subject.

9. A structure as set forth in claim 1, wherein said diaphragm means comprises a first and a second setting member each movable between an uncocked and a cocked position, cocking means for moving said setting members to cocked positions, means for permanently biasing said setting members to uncocked positions, retarding means for controlling the rate of speed of said first cocking member in response to the action of said biasing means, and means for increasing the size of said aperture in response to movement of said first setting member to uncocked position while said second setting member remains in cocked position, said switching unit comprising electromagnet means energizable to thereby hold said second setting member in cocked position and transistor means for deenergizing said electromagnet as a function of the condition of said capacitor.

10. A structure as set forth in claim 9, wherein said transistor means comprises two transistors having emitters connected with the positive pole of said source, one of said transistors having a base connected to a tap between said capacitor and said light-sensitive resistor element and a collector connected to the base of the other transistor, the other transistor having a collector connected with one terminal of said electromagnet and a base connected in series with said resistor element, said electromagnet having another terminal connected in series with said resistor element.

11. A structure as set forth in claim 1, wherein said switching unit comprises means for initiating closing of said aperture as a function of the condition of said capacitor.

References Cited

UNITED STATES PATENTS

| 3,270,650 | 9/1966 | Ernisse | 95—10 XR |
| 3,308,733 | 3/1967 | Von Albedyll et al. | 95—10 |
| 3,336,850 | 8/1967 | Otani et al. | 95—10 |
| 3,362,309 | 1/1968 | Cooper et al. | 95—10 |
| 3,368,468 | 2/1968 | Rentschler | 95—10 |
| 3,376,801 | 4/1968 | Fanlenberg | 95—63 XR |

NORTON ANSHER, *Primary Examiner.*

J. F. PETERS, JR., *Assistant Examiner.*

U.S. Cl. X.R.

95—11.5, 64